United States Patent [19]

Sekmakas et al.

[11] Patent Number: 4,737,529

[45] Date of Patent: Apr. 12, 1988

[54] CATHODIC ELECTROCOAT COMPOSITIONS CONTAINING EPOXY PHOSPHATES

[75] Inventors: Kazys Sekmakas, St. Petersburg Beach, Fla.; Aurelio Parenti, Norridge, Ill.

[73] Assignee: DeSoto, Inc., Des Plaines, Ill.

[21] Appl. No.: 847,648

[22] Filed: Apr. 3, 1986

[51] Int. Cl.$^4$ .................. C08L 63/02; C08L 33/14
[52] U.S. Cl. .................. 523/411; 523/403; 523/404; 524/901
[58] Field of Search ............... 523/411, 402, 403, 404

[56] References Cited

U.S. PATENT DOCUMENTS

| | | | |
|---|---|---|---|
| 4,461,857 | 7/1984 | Sekmakas | 523/402 |
| 4,487,860 | 12/1984 | Winner | 523/402 |
| 4,503,173 | 3/1985 | Martino | 523/404 |
| 4,508,765 | 4/1985 | Ring | 523/402 |
| 4,522,961 | 1/1985 | Martino | 523/411 |
| 4,598,109 | 7/1986 | Sekmakas | 523/402 |

*Primary Examiner*—C. Warren Ivy
*Attorney, Agent, or Firm*—Dressler, Goldsmith, Shore, Sutker & Milnamow, Ltd.

[57] ABSTRACT

Aqueous thermosetting cationic electrocoating compositions are disclosed in which an amine-functional cationic polymer is dispersed in water with the aid of an acid, a curing agent being added if the polymer is not self-curing, and there is added from 1% to 30% of the polymer content of the composition of an oxirane-free epoxy phosphate. This epoxy phosphate is produced by slowly and incrementally adding a resinous polyepoxide to a solvent solution containing from 0.05 to 0.9 mole of orthophosphoric acid per oxirane equivalent in said polyepoxide together with sufficient water to hydrolyze all of the oxirane functionality which is not consumed by the orthophosphoric acid. When the epoxy phosphate is made in the manner set forth, the salt spray resistance of electrodeposited cured films is improved.

9 Claims, No Drawings

CATHODIC ELECTROCOAT COMPOSITIONS CONTAINING EPOXY PHOSPHATES

TECHNICAL FIELD

This invention relates to cathodic electrocoat compositions adapted to deposit coatings exhibiting improved corrosion resistance.

BACKGROUND OF THE INVENTION

Amine-functional polymers, and especially amine-functional acrylic copolymers, can be dispersed in water with the aid of an acid, such as acetic acid, which protonates the amine groups in the polymer. These aqueous dispersions at appropriate low solids content for electrocoating (from 3% to 20%, more preferably from 5% to 15%) are electrodeposited at the cathode of a unidirectional electrical system. A curing agent, typically a phenoplast or an aminoplast resin, is usually incorporated into the aqueous composition and electrodeposited together with the amine polymer. When the deposited coatings are baked, highly useful cured coatings are obtained. However, the corrosion resistance of the cured coatings formed by electrodepositing these known aqueous cathodic electrocoat compositions is less than desired, and it is the intention of the invention to improve the corrosion resistance, especially as indicated by salt spray testing.

DISCLOSURE OF INVENTION

In accordance with this invention, the known aqueous cationic coating compositions which comprise an amine-functional polymer dispersed in water with the aid of an acid and, when the polymer is not self-curing, a curing agent therefor, are modified for improved corrosion resistance by the inclusion in the composition of from 1% to 30%, preferably from 4% to 15%, of the polymer content of the composition of an oxirane-free epoxy phosphate. When these modified cationic coating compositions are electrodeposited at the cathode and cured by baking at appropriate temperature, it is found that the corrosion resistance of the cured coatings is enhanced while the other desirable attributes of the unmodified coating are retained. Salt spray resistance is particularly benefitted.

The cationic amine-functional polymers may be any organic solvent-soluble polymer containing a sufficient amine content to enable stable dispersion in water with the aid of a solubilizing acid. The solubilizing acids are themselves well known, being usually organic volatile carboxylic acids.

The production of typical cationic amine-functional copolymers in water-miscible volatile organic solvent is shown in U.S. Pat. No. 4,195,147 issued Mar. 25, 1980 to Kazys Sekmakas and Raj Shah. In this patent, the volatile acid used for the partial neutralization of the amine groups, such as dimethylol propionic acid, is present during the copolymerization of the monoethylenically unsaturated monomers which are used to form the desired polymer. This acid is preferbly used in an amount of from 20% to 90% of that needed to react with all the amine groups present, preferably from 25% to 70%, and this provides a water dispersible solution copolymer product which has a pH which is usually in the range of 5-7.5, preferably less than 7.0. These copolymers are dispersed in water for cathodic electrocoating at a resin solids content which is typically about 10%.

Amine polymers which are not acrylic copolymers are illustrated in Sekmakas and Shah U.S. Pat. No. 4,447,982 issued Oct. 14, 1980. In this patent the polymers which are dispersed in water with the aid of a volatile acid are copolymers of monomers with adducts of a polyepoxide with an unsaturated secondary amine. This patent illustrates the use of preferred heat-hardening formaldehyde condensates which are dispersed in the aqueous medium to cure the electrodeposited amine polymer. The curing agents used in this patent and which are useful herein are phenolic curing agents.

U.S. Pat. No. 4,260,730 to Sekmakas and Thomas H. Plaisance shows bisphenol-formaldehyde condensates which are prepared in the substantial absence of contaminating salts and which are useful as curing agents in amine-functional electrocoating baths.

The phenolic resins which may be used as curing agents herein may be water soluble, but they are more desirably solvent soluble materials which disperse in acidic resin aqueous dispersions, such as those disclosed in the Sekmakas and Shah U.S. Pat. No. 4,447,982 noted previously.

Turning to the monoethylenically unsaturated monomers which are copolymerized in organic solvent solution to provide the soluble copolymers which are primarily contemplated herein, these will include "nonreactive" monomers and will usually also include reactive monomers unless reactive groups are supplied by some higher molecular weight entity with which the monomers are polymerized, such as the epoxy resin derivative noted previously. The purpose is to provide a polymer containing groups which can be used for cure, either because they are reactive under normal curing conditions with themselves or other groups in the polymer, or because they are reactive under normal curing conditions which reactive groups supplied by a extraneous curing agent such as the aminoplast and phenoplast resins which have been noted.

The term "nonreactive" as applied to a monomer denotes the absence in the monomer of functional groups, other than the single polymerizable unsaturated group, which will react under the contemplated conditions of polymerization and cure. Normally, this means that the single ethylenic group is the only potentially reactive group present. Suitable nonreactive monomers are illustrated by styrene, vinyl toluene, $C_1$-$C_8$ alkyl esters of monoethylenically unsaturated acids, like methyl methacrylate, vinyl acetate, acrylonitrile, and the like. In the preferred practice of this invention, 20% to 45% of styrene and/or vinyl toluene is combined with from 25% to 40% of alkyl acrylate or methacrylate, such as butyl acrylate or ethyl hexyl methacrylate, and from 3% to 35%, preferably from 10% to 25%, of the amine-functional monomer.

The amine-functional monomers which may be used are well known and are desirbly aminoalkyl derivatives of a monoethylenically unsaturated carboxylic acid or an amide thereof. Dimethyl aminoethyl methacrylate is quite suitable, but any monoethylenically unsaturated copolymerizable amine, be it primary, secondary, or tertiary may be used. The tertiary amines are most available and are preferred. Other suitable amine monomers are illustrated by dimethyl aminopropyl methacrylate, monomethyl aminoethyl methacrylate, aminoethyl methacrylate, and the corresponding acrylates crotonates, and the like. The amino amides are quite useful and are illustrated by dimethyl aminopropyl methacrylamide.

Reactive monomers may provide cure in the absence of an external cross-linking agent, or they may require such external agent for cure. Monomers which enable cure in the absence of an external agent are illustrated by isobutoxymethyl acrylamide or isobutoxymethyl methacrylamide. These may be replaced by other alkyl ethers of N-methylol acrylamide or methacrylamide, such as the hexyl or octyl ethers.

Reactive monomers which require an external curing agent, or which can be used in combination with self-curing reactive monomers, are hydroxy monomers, illustrated by 2-hydroxyethyl acrylate, 2-hydroxypropyl acrylate and the corresponding methacrylates. These are broadly defined as the $C_2$–$C_4$ hydroxyalkyl esters of monoethylenic monocarboxylic acids. Carboxylic acids are also useful, either as reactive monomers or to catalyze other reactions, such as acrylic acid or methacrylic acid. Crotonic acid, itaconic acid, maleic acid and monobutyl maleate will further illustrate useful acids which are usually used in an amount of less than 5% of the polymer.

The cationic amine-functional polymers useful herein may also be Mannich base copolymers, as disclosed in Sekmakas, Shah and Aurelio J. Parenti U.S. Pat. No. 4,341,681 issued July 27, 1982. These are stble after partial neutralization with a solubilizing acid in aqueous dispersion at a pH of from 5–11, preferably 7–10, and the production of these copolymers is further illustrated in Sekmakas and Shah U.S. Pat. Nos. 4,387,197 issuesd June 7, 1983 and 4,396,732 issued Aug. 2, 1983.

The preferred curing agents used herein, whether within or without the amine polymer, contain the methylol group (which is carried by nitrogen in the aminoplast resins). These cure by a condensation reaction in which alcohol is removed. This reaction is catalyzed by the presence of acid, and the phosphoric acid reaction products used herein likely have this function. The carboxyl group is also reactive with the methylol group, and this reaction eliminates any excess acidity which may be included in the amine polymer.

The curing agents are desirably methylol functional, such as aminoplast resins or phenoplast resins, but blocked polyisocyanates are also useful, and all of these are well known in the cathodic elecrtrocoating art. Suitable phenoplast resins have been referred to previously. Suitable aminoplast resins and bisphenol-formaldehyde resins which may be used are disclosed in Sekmakas and Shah U.S. Pat. No. 4,265,795 issued May 5, 1981. Appropriate bisphenol-formaldehyde resins are further illustrated in Edward J. Murphy U.S. Pat. No. 4,278,579 issued July 14, 1981. Production of the bisphenol-formaldehyde ethers which are preferred is further illustrated in U.S. Pat. No. 4,310,653 issued Jan. 12, 1982 to John J. Krajkewski and Murphy.

When an N-methylol functional monomer is included within the amine-functional polymer, it is desirably used in an amount of from 5% to 40% of the copolymer, preferably from 20% to 35%, and even when it is used, an external curing agent may still be used, albeit in smaller amount than if the N-methylol functional monomer were not included within the amine-functional polymer.

All proportions herein and in the accompanying claims are by weight, unless otherwise specified.

The preferred acids for solubilizing the amine polymers are volatile organic acids, such as acetic acid, glycollic acid, and, most preferably, dimethylol propionic acid. Carbonic acid is also useful. Inorganic acids which do not damage the deposited film, like phosphoric acid, may also be used. Acids which vaporize or decompose are particularly contemplated.

The solubilizing acids may be present during polymerization, as taught in U.S. Pat. No. 4,195,147, or added later.

The partially neutralized amine polymers are dispersed in water, together with a curing agent if needed, and enough water is used to provide aqueous dispersions at appropriate low solids content for electrocoating (from 3% to 20%, more preferably from 5% to 15%). The water miscible volatile organic solvent used in the polymerization is retained and the presence of the solvent helps to provide the stable dispersions needed for electrocoating. The preparation of the amine polymer as taught in the prior art noted herein also helps to provide the needed stable dispersion.

The oxirane-free epoxy phosphates used herein are provided by reacting a resinous polyepoxide with from 0.05 to 0.9 mole, preferably from 0.1 to 0.7 mole, and most preferably from 0.2 to 0.5 mole or orthophosphoric acid per equivalent of oxirane in the polyepoxide using a process in which a water miscible organic solvent in admixture with orthophosphoric acid (which contains a limited amount of water) is heated to reaction temperature together with an amount of water such that the total amount of water is sufficient to hydrolyze that portion of the oxirane functionality in the polyepoxide which does not react with the phosphoric acid. The resinous polyepoxide is then slowly (incrementally) added to the heated mixture so that reaction with phosphoric acid and hydrolysis of the oxirane groups will occur to consume the added epoxy functionality quickly and thereby minimize the concentration of oxirane functionality in the reaction mixture as the reaction proceeds. This minimizes epoxy-epoxy reactions which increase the molecular weight of the product and impair the capacity of the epoxy phosphate which is produced to be used in the cathodic electrocoat compositions under consideration.

The proportion of water can be increased above the minimum specified above and may exceed the equivalents of polyepoxide, as illustrated in Example 1 hereinafter. The amount of water is preferably sufficient to consume at least about 50% and more preferably at least about 75% of the oxirane functionality in the epoxy resin reactant.

The temperature of reaction for the production of the hydrolyzed epoxy phosphates can vary from about 80° C. to about 130° C. Under these moderate conditions, the reaction is limited to essentially only one of the three OH groups in the orthophosphoric acid. It is preferred to use a relatively high boiling solvent, like 2-butoxy ethanol, and to use reaction temperatures near the boiling point of water, e.g., 90° C. to 105° C.

While any water miscible organic solvent can be used, like acetone, butanol, isopropanol, and the like, the ether alcohols illustrated by the preferred 2-butoxy ethanol, are preferred. In the presence of the phosphoric acid, no catalyst is needed and the desired epoxy-consuming reactions proceed without it. In a preferred embodiment, more than 75 percent of the organic sovlent is 2-butoxyethanol.

The presence of the phosphoric acid provides acidity which can be measured. This acidity remains in the films which are electrodeposited and may help to disperse the epoxy phosphate solutions which are produced herein in the aqueous electrocoating baths which they are added to. Also, the phosphoric acid groups catalyze the cure, especially when an aminoplast resin is the curig agent. The amount of phosphoric acid used is adjusted to provide the desired water dispersibility and cure enhancement, and these factors will vary with the polyepoxide selected, the proportion of solvent and the cure which is desired.

While orthophosphoric acid is usually used, pyrophosphoric acid is considered an equivalent because it generates orthophosphoric acid.

Any organic solvent-soluble resinous polyepoxide may be used herein. By a polyepoxide is meant an epoxide having a 1,2-epoxy equivalency of at least about 1.2. Diepoxides are preferred, especially diglycidyl ethers of bisphenols having a 1,2-epoxy equivalency in the range of 1.3–2.0. The class of bisphenols is well known, and bisphenol A is usually used in commerce. Diglycidyl ethers of bisphenol A are commonly available in commerce and such commercial materials may be used herein. These may have a molecular weight of from about 350 to about 8,000. It is preferred to employ those polyepoxides having a 1,2-epoxy equivalency of from 1.7–2.0 and an average molecular weight (by calculation) of from about 500 up to about 5000. A molecular weight of from about 600 to about 3,000 is particularly preferred. Epon 1004 from Shell Chemical Company, Houston, Tex. is useful herein. Epon 1001 (also available from Shell) further illustrates suitable polyepoxides, and is preferred.

The term "a bisphenol" is known to describe compounds of the formula:

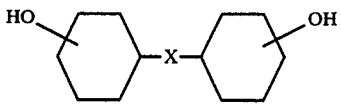

in which X is a straight chain or branched chain divalent aliphatic radical of from 1 to 3 carbon atoms, of $>SO_2$, $>SO$, or —O—.

The preferred bisphenol is bisphenol A (4,4'-isopropylidenediphenol) in which X is 2,2-propylidene and the two hydroxyl groups are in the para position. Other suitable bisphenols include 4,4'-thiodiphenol and 4,4'-sulfonyldiphenol.

A preferred embodiment of the invention will be described using a preferred diglycidyl ether of bisphenol A having a number average molecular weight of about 1000.

As previously noted, the reaction wit the stoichiometric deficiency of orthophosphoric acid leaves some of the epoxy groups unreacted. These unreacted epoxy groups are preferably hydrolyzed with water present in the reaction mixture when the polyepoxide is added thereto. However, there is usually some alcohol present in the reaction mixture, so some esterification with alcohol may take place. These unreacted epoxy groups lead to instability in the aqueous dispersions which are formed, so any significant proportion thereof cannot be tolerated.

In conventional electrocoating practice, grounded conductive objects are immersed in the electrocoating bath and a unidirectional electrical current is passed through the bath and through the grounded object as cathode to cause the amine polymers, curing agent and any pigment dispersed in the bath to be electrodeposited upon the cathode.

The voltages used for electrodeposition, the washing procedures employed to rinse off the bath material which remains on the electrocoated object (which is usually ferrous metal) and the baking conditions generally applicable to the various amine polymer systems in use, are all known in the art and are illustrated in the example of preferred practice herein.

EXAMPLE 1

1320 grams of 2-butoxy ethanol, 94.4 grams of 85% ortho phosphoric acid and 130 grams of additional water are heated to 95° C. in a reactor and then 2100 grams of a diglycidyl ether of bisphenol A having a number average molecular weight of 1000 (Shell Chemical Company product Epon 1001 may be used) are added slowly over 30 minutes. The temperature is then held at 95° C. for 3 hours to insure completion of all the reactions (with the phosphoric acid present and with the water). Then 480 grams of additional 2-butoxy ethanol are added to dilute the product to 55.1% solids content. The solution product has a Gardner-Holdt viscosity of Y-Z and an acid value (based on the nonvolatiles) of 41.5.

EXAMPLE 2

A concentrate is made by sand grinding 223 parts of an amine copolymer solution at 58% solids content with 174 parts of titanium dioxide, rutile, 9 parts of fumed silica and 8 parts of a black shading paste to provide a desired tint. Grinding is continued to a Hegman grind rating of 7.

The amine copolymer solution referred to above is a copolymer formed by copolymerizing 34.5 parts of styrene, 30.6 parts of n-butyl acrylate, 17.5 parts of 2-hydroxyethyl acrylate and 17.5 parts of dimethyl aminopropyl methacrylamide in 58% solvent solution in a solvent mix containing 65.3% of 2-butoxy ethanol and 34.7 parts of isopropanol.

EXAMPLE 3

The concentrate of Example 2 is let down by stirring in 359 parts of the same amine copolymer solution used in Example 2, 120 parts of a partially butylated hexamethoxymethyl melamine (Cymel 1130 of American Cyanamid may be used) and 82 parts of the epoxy phosphate of Example 1. 6 parts of an acid catalyst (bis-2-ethylhexyl phosphoric acid), and 30 parts of dimethylol propionic acid to partially neutralize the amine copolymer (about 60%) are then mixed in to provide a saleable product which can be diluted with deionized water to the solids content desired for bath use. This is done by slowly adding the paint composition described in this Example to deionized water until the solids content is about 12%.

EXAMPLE 4

Two bath compositions were compared, namely: the bath composition of Example 3 with the same bath composition lacking the Example 1 epoxy phosphate.

Without the epoxy phosphate, the bath had a pH of 5.77 and a conductivity of 990 micromhos. With the epoxy phosphate, the unneutralized phosphorus OH groups decreased the pH slightly to pH 5.32 and the conductivity increased slightly to 1000 micromhos. Neither of these slight changes is considered to be significant.

The above electrocoating baths were used in a cathodic electrocoating process in which coatings were electrodeposited onto iron phosphate-treated cold rolled steel panels (Parker Chemical Company designation EP-10) using a bath temperature held in the range of 85°–90° F. and 125 volts (until current flow is unduly slowed by the resistive film which is deposited) to deposit a film having a dry thickness in the range of 0.85–1.0 mil. The electrocoated panels were then rinsed with deionized water and baked for 20 minutes in a 425° F. oven.

The respective cured coatings were close in appearance, but when cut to base metal and subjected to continuous salt spray in a dark chamber at 95° F. for 400 hours (ASTM test B 117), the coatings lacking the epoxy phosphate rusted and the rust crept away from the cut line an average of almost ¼th inch and many blisters were present. The coatings containing the epoxy phosphate showed less rusting (averaging ⅛th inch creep from the cut) and blistering was significantly reduced.

Similar favorable results were obtained using zinc phosphate-treated cold rolled steel panels, albeit the improvement was not as great. The iron phosphate treatment, however, is a more practical and less costly pretreatment.

What is claimed is:

1. An aqueous thermosetting cationic electrocoating composition comprising an admixture of an amine-functional cationic polymer dispersed in water with the aid of an acid, with from 1% to 30% by weight of the polymer content of the composition of an unneutralized oxirane-free epoxy phosphate, said epoxy phosphate being produced by slowly and incrementally adding a resinous polyepoxide which is a diglycidyl ether of a bisphenol having a 1,2-epoxy equivalency in the range of 1.3–2.0 to a solution containing from 0.05 to 0.9 mole of orthophosphoric acid per oxirane equivalent in said polyepoxide in water miscible organic solvent together with sufficient water to hydrolyze all of the oxirane functionality which is not consumed by said orthophosphoric acid.

2. An aqueous electrocoating composition as recited in claim 1 in which said epoxy phosphate is present in an amount of from 4% to 15%.

3. An aqueous electrocoating composition as recited in claim 1 in which said polyepoxide has an average molecular weight of from about 500 up to about 5000, and orthophosphoric acid is used in an amount of from 0.1 to 0.7 mole of ortho phosphoric acid per oxirane equivalent in said polyepoxide.

4. An aqueous electrocoating composition as recited in claim 3 in which said diglycidyl ether of a bisphenol has a 1,2-epoxy equivalency in the range of from 1.7 to 2.0 and an average molecular weight of from about 600 up to about 3000, and orthophosphoric acid is used in an amount of from 0.2 to 0.5 mole of ortho phosphoric acid per oxirane equivalent in said polyepoxide.

5. An aqueous electrocoating composition as recited in claim 1 in which said amine-functional cationic polymer is an hydroxy-functional amine copolymer and a curing agent therefore is also present.

6. An aqueous electrocoating composition as recited in claim 5 in which said curing agent is an aminoplast resin.

7. An aqueous thermosetting electrocoating bath having a solids content in the range of from 3% to 20% by weight and comprising, an admixture of water having dispersed therein an amine-functional cationic copolymer of monoethylenically unsaturated monomers comprising hydroxy-functional monomer and a dimethyl aminoalkyl acrylate or methacrylate or amide thereof dispersed in said water with the aid of a water-miscible volatile organic solvent and a volatile acid, with an aminoplast resin curing agent for said copolymer, and from 4% to 15% by weight of the polymer content of the composition of an unneutralized oxirane-free epoxy phosphate, said epoxy phosphate being produced by slowly and incrementally adding a diglycidyl ether of a bisphenol having a 1,2-epoxy equivalency in the range of from 1.7 to 2.0 and an average molecular weight of from about 600 up to about 3000 to a solution of orthophosphoric acid in water miscible organic solvent containing sufficient water to hydrolyze all of the oxirane functionality which is not consumed by said orthophosphoric acid, said acid being used in an amount of from 0.2 to 0.5 mole of ortho phosphoric acid per oxirane equivalent in said diglycidyl ether.

8. An aqueous electrocoating bath as recited in claim 7 in which said bath has a solids content of fro 5% to 15% and pigment is present.

9. An aqueous electrocoating bath as recited in claim 7 in which said copolymer contains 2-hydroxethyl acrylate and dimethyl aminopropyl methacrylamide.

* * * * *